(12) United States Patent
Wu et al.

(10) Patent No.: US 12,052,734 B2
(45) Date of Patent: Jul. 30, 2024

(54) PRIORITIZED HARQ FEEDBACK TRANSMISSION

(71) Applicant: QUALCOMM Incorporated, San Diego, CA (US)

(72) Inventors: Shuanshuan Wu, San Diego, CA (US); Tien Viet Nguyen, Bridgewater, NJ (US); Sony Akkarakaran, Poway, CA (US); Peter Gaal, San Diego, CA (US); Tao Luo, San Diego, CA (US); Jing Sun, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/404,302

(22) Filed: Aug. 17, 2021

(65) Prior Publication Data
US 2022/0124719 A1   Apr. 21, 2022

Related U.S. Application Data

(60) Provisional application No. 63/092,135, filed on Oct. 15, 2020.

(51) Int. Cl.
| | |
|---|---|
| *H04W 72/52* | (2023.01) |
| *H04L 1/00* | (2006.01) |
| *H04L 1/1607* | (2023.01) |
| *H04L 1/1812* | (2023.01) |
| *H04L 1/1829* | (2023.01) |
| *H04W 72/56* | (2023.01) |

(52) U.S. Cl.
CPC ........... *H04W 72/52* (2023.01); *H04L 1/1607* (2013.01); *H04L 1/1812* (2013.01); *H04W 72/56* (2023.01)

(58) Field of Classification Search
CPC .... H04W 72/52; H04W 72/56; H04L 1/1607; H04L 1/1812
See application file for complete search history.

(56) References Cited

U.S. PATENT DOCUMENTS

| | | | |
|---|---|---|---|
| 2022/0377761 A1* | 11/2022 | Lee | H04W 92/18 |
| 2023/0112147 A1* | 4/2023 | Chien | H04L 1/1861 |
| | | | 370/329 |
| 2023/0146928 A1* | 5/2023 | Hwang | H04W 52/367 |
| | | | 370/329 |

OTHER PUBLICATIONS

Huawei et al.(R1-1911887, "Sidelink physical layer procedures for NR V2X", Reno, USA, Nov. 18-22, 2019) (Year: 2019).*
InterDigital (R1-2004296, "Remaining Issues on Physical Layer Procedures for NR V2X", e-Meeting, May 25-May 29, 2020) (Year: 2020).*

(Continued)

*Primary Examiner* — Xuan Lu
(74) *Attorney, Agent, or Firm* — Patterson + Sheridan, LLP

(57) ABSTRACT

Certain aspects of the present disclosure provide techniques for determining priority information associated with hybrid automatic repeat request (HARQ) feedbacks for wireless nodes in sidelink communications. A subset of the HARQ feedbacks are selected based on the priority information. The selected HARQ feedbacks are then transmitted to the second wireless nodes.

18 Claims, 8 Drawing Sheets

(56) References Cited

OTHER PUBLICATIONS

Huawei, et al., "Sidelink Physical Layer Procedures for NR V2X", 3GPP TSG RAN WG1 Meeting #99, 3GPP Draft, R1-1911887, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 30 Pages, XP051823069.
Interdigital Inc., "Remaining Issues on Physical Layer Procedures for NR V2X," 3GPP Draft, 3GPP TSG RAN WG1 #101, R1-2004296, 3rd Generation Partnership Project (3GPP), Mobile Competence Centre, 650, Route Des Lucioles, F-06921, Sophia-Antipolis Cedex, France, vol. RAN WG1, No. e-Meeting; May 25, 2020-May 29, 2020, May 15, 2020 (May 15, 2020), XP051886040, 9 pages.
International Search Report and Written Opinion—PCT/US2021/047523—ISA/EPO—dated Dec. 10, 2021.

* cited by examiner

PRIORITIZED HARQ FEEDBACK TRANSMISSION

CROSS REFERENCE TO RELATED APPLICATION

This application hereby claims priority under 35 U.S.C. § 119 to U.S. Provisional Patent Application No. 63/092,135, filed on Oct. 15, 2020, the contents of which are incorporated herein in their entirety.

BACKGROUND

Field of the Disclosure

Aspects of the present disclosure relate to wireless communications and, more particularly, to management of hybrid automatic repeat request (HARQ) feedback operations in sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

Systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and efficient techniques for selecting and sending hybrid automatic repeat request (HARQ) feedbacks based on their priority in sidelink communications.

Certain aspects of the subject matter described in this disclosure can be implemented in a method for wireless communications by a first wireless node (e.g., a receiver user equipment (UE)). The method may include determining priority information associated with HARQ feedbacks, for second wireless nodes (e.g., transmitter UEs), based on the number of the HARQ feedbacks being equal to or greater than a threshold number of HARQ feedbacks. The method may further include selecting one or more of the HARQ feedbacks based on the priority information where the number of the one or more HARQ feedbacks is equal to or less than the threshold number of HARQ feedbacks. The method may further include transmitting the selected one or more HARQ feedbacks to one or more of the second wireless nodes.

Certain aspects of the subject matter described in this disclosure can be implemented in a first wireless node. The first wireless node may include means for determining priority information associated with hybrid automatic repeat request (HARQ) feedbacks, for second wireless nodes, based on the number of the HARQ feedbacks being equal to or greater than a threshold number of HARQ feedbacks; means for selecting one or more of the HARQ feedbacks based on the priority information, wherein the number of the one or more HARQ feedbacks is equal to or less than the threshold number of HARQ feedbacks; and means for transmitting the selected one or more HARQ feedbacks to one or more of the second wireless nodes.

Certain aspects of the subject matter described in this disclosure can be implemented in a first wireless node. The first wireless node may include a processing system configured to determine priority information associated with hybrid automatic repeat request (HARQ) feedbacks, for second wireless nodes, based on the number of the HARQ feedbacks being equal to or greater than a threshold number of HARQ feedbacks and select one or more of the HARQ feedbacks based on the priority information, wherein the number of the one or more HARQ feedbacks is equal to or less than the threshold number of HARQ feedbacks; and a transmitter configured to transmit the selected one or more HARQ feedbacks to one or more of the second wireless nodes Certain aspects of the subject matter described in this disclosure can be implemented in an apparatus for wireless communications by a first wireless node. The apparatus may include a processing system configured to determine priority information associated with hybrid automatic repeat request (HARQ) feedbacks, for second wireless nodes, based on the number of the HARQ feedbacks being equal to or greater than a threshold number of HARQ feedbacks and select one or more of the HARQ feedbacks based on the priority information, wherein the number of the one or more HARQ feedbacks is equal to or less than the threshold number of HARQ feedbacks; and an interface configured to output, for transmission, the selected one or more HARQ feedbacks to one or more of the second wireless nodes.

Certain aspects of the subject matter described in this disclosure can be implemented in a computer-readable medium for wireless communications by a first wireless node. The computer-readable medium may include codes or instructions executable to determine priority information associated with hybrid automatic repeat request (HARQ) feedbacks, for second wireless nodes, based on the number of the HARQ feedbacks being equal to or greater than a threshold number of HARQ feedbacks, select one or more of the HARQ feedbacks based on the priority information, wherein the number of the one or more HARQ feedbacks is equal to or less than the threshold number of HARQ feedbacks, and output, for transmission, the selected one or more HARQ feedbacks to one or more of the second wireless nodes.

Aspects of the present disclosure provide wireless nodes, means for, apparatuses, processors, and computer-readable mediums for performing techniques and methods that may be complementary to the operations by the first wireless node described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
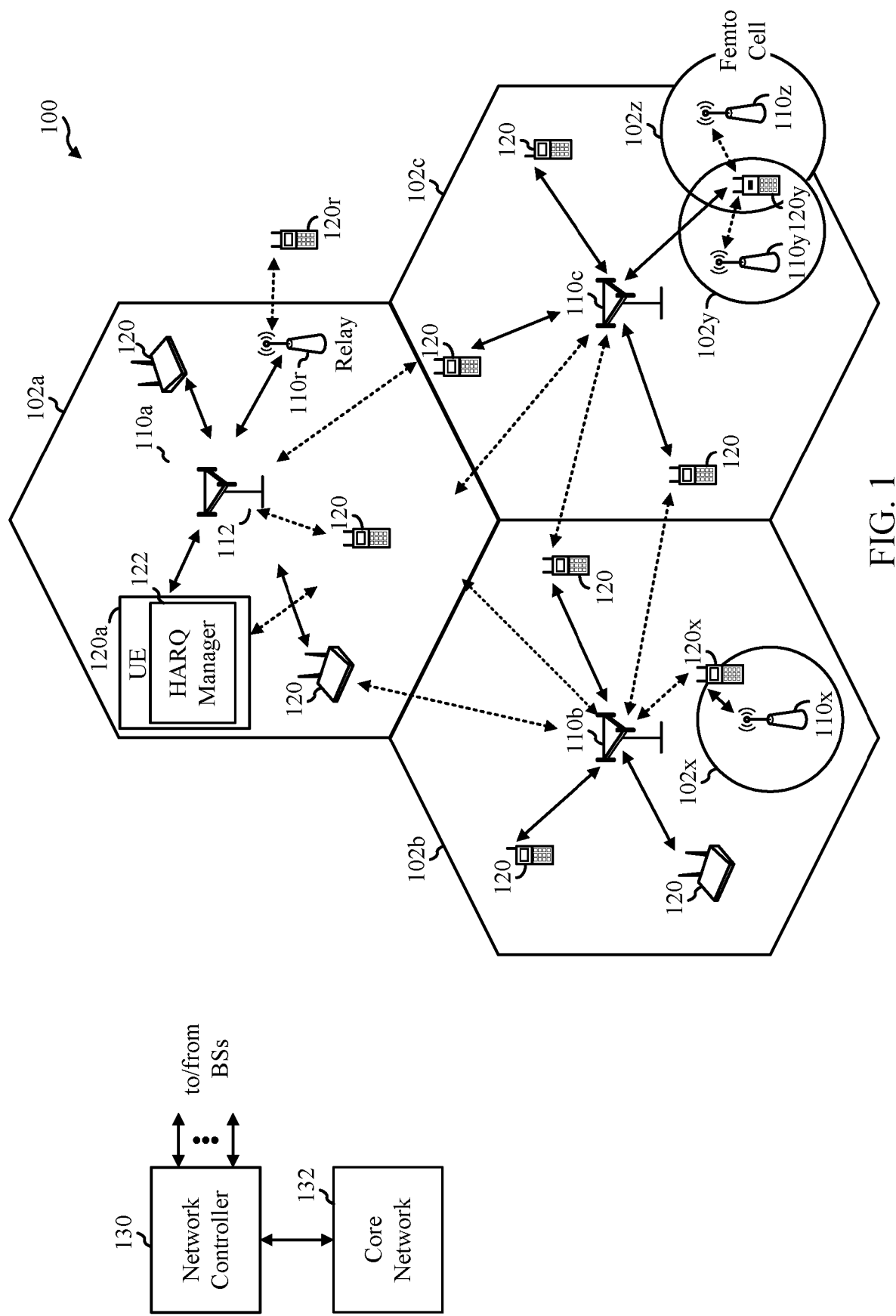
FIG. 1 is a block diagram conceptually illustrating an example wireless communication network, in accordance with certain aspects of the present disclosure.

Aspects of the present disclosure provide apparatus, methods, processing systems, and computer readable mediums for determining priority information associated with hybrid automatic repeat request (HARQ) feedbacks for wireless nodes in sidelink communications. Some HARQ feedbacks are selected based on the priority information. The selected HARQ feedbacks are then transmitted to the wireless nodes.

The following description provides examples of techniques for selecting and sending HARQ feedbacks in sidelink communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

The teachings herein may be incorporated into (e.g., implemented within or performed by) a variety of wired or wireless apparatuses (e.g., nodes). In some aspects, a wireless node implemented in accordance with the teachings herein may comprise an access point (AP) or an access terminal (AT).

The AP may comprise, be implemented as, or known as a node B (NB), a radio network controller (RNC), an evolved node B (eNB), a base station controller (BSC), a base transceiver station (BTS), a base station (BS), a transceiver function (TF), a radio router, a radio transceiver, a basic service set (BSS), an extended service set (ESS), a radio base station ("RBS"), an integrated access and backhauling (IAB) node (e.g., an IAB donor node, an IAB parent node, and an IAB child node), or some other terminology.

The AT may comprise, be implemented as, or known as a subscriber station, a subscriber unit, a mobile station, a remote station, a remote terminal, a user terminal, a user agent, a user device, a user equipment (UE), a user station, or some other terminology. In some implementations, the AT may comprise a cellular telephone, a cordless telephone, a session initiation protocol (SIP) phone, a wireless local loop (WLL) station, a personal digital assistant (PDA), a handheld device having wireless connection capability, a station (STA), or some other suitable processing device connected to a wireless modem (such as an augmented reality (AR)/virtual reality (VR) console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Example Telecommunications System

FIG. 1 illustrates an example wireless communication network 100, in which aspects of the present disclosure may be practiced. For example, the wireless communication network 100 may include one or more user equipments (UEs) 120a (with a hybrid automatic repeat request (HARQ) module 122) configured to perform operations 700 of FIG. 7 and/or one or more base stations (BSs) 110a.

The wireless communication network 100 is in communication with a core network 132. The core network 132 is in communication with the one or more BSs 110 that and/or the one or more UEs 120 in the wireless communication network 100, via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 may communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The wireless communication network 100 may include relay stations (not shown). A relay station is a station that receives a transmission of data and/or other information from an upstream station (e.g., the BS 110 or the UE 120) and sends a transmission of the data and/or other information to a downstream station (e.g., the UE 120 or the BS 110). The relay station may also be the UE 120 that relays transmissions for other UEs 120. In the example shown in FIG. 1, a relay station may communicate with the BS 110a and a UE 120r in order to facilitate communication between the BS 110a and the UE 120r. The relay station may also be referred to as an IAB node, a relay AP, a relay, etc.

The wireless communication network 100 may be a heterogeneous network that includes BSs 110 of different types, e.g., macro AP, pico AP, femto AP, relays, etc. These different types of BSs 110 may have different transmit power levels, different coverage areas, and different impact on interference in the wireless communication network 100.

For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the BSs 110 may have similar frame timing, and transmissions from the different BSs 110 may be approximately aligned in time. For asynchronous operation, the BSs 110 may have different frame timing, and transmissions from the different BSs 110 may not be aligned in time. The techniques described herein may be used for both synchronous and asynchronous operation.

Figure 2:
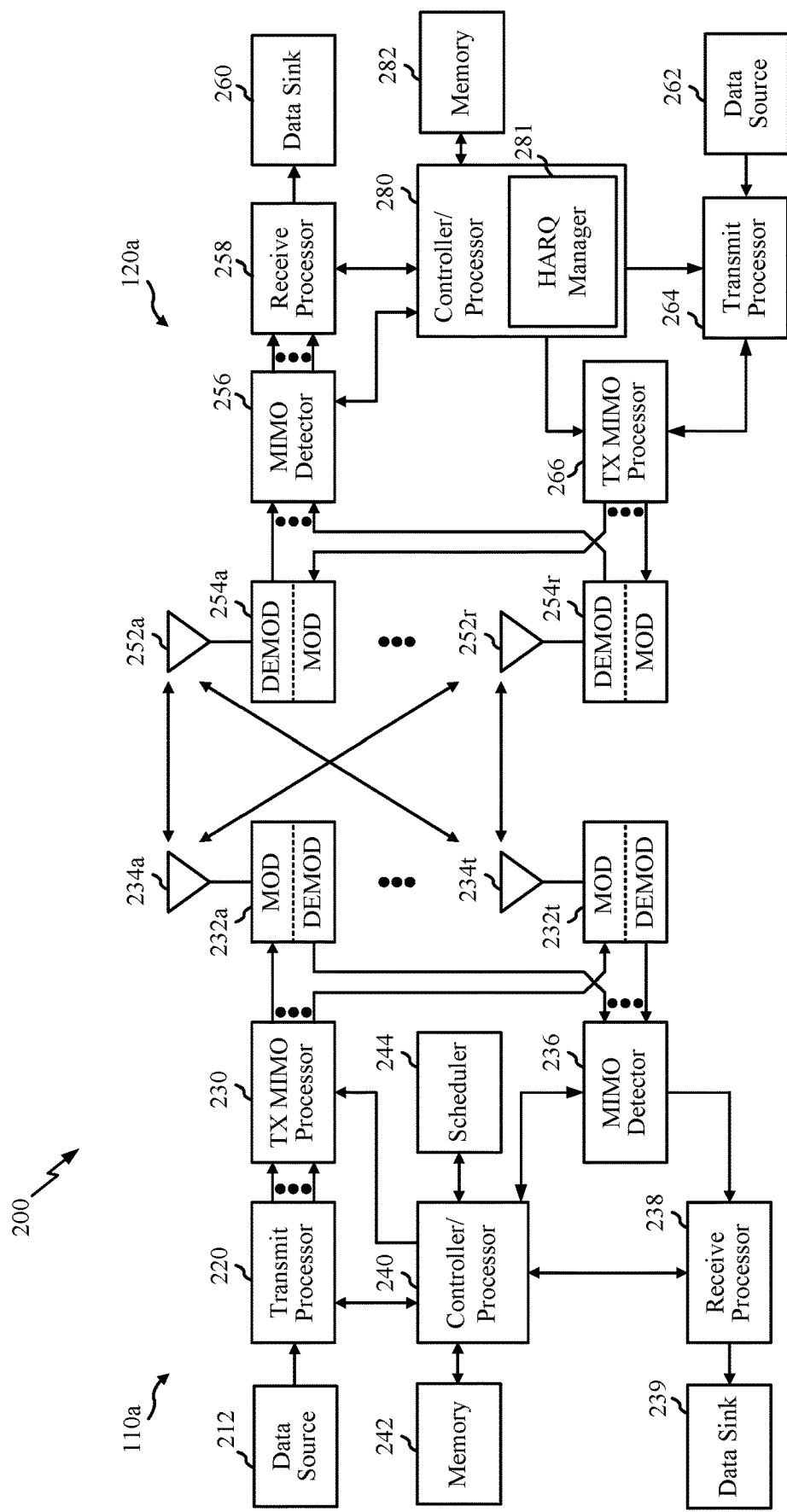
FIG. 2 is a block diagram conceptually illustrating a design of an example a base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via antennas 234a-234t, respectively.

At the UE 120a, antennas 252a-252r may receive the downlink signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for a physical uplink shared channel (PUSCH)) from a data source 262 and control information (e.g., for a physical uplink control channel (PUCCH)) from the controller/processor 280. The transmit processor 264 may also generate reference symbols for a reference signal (e.g., for a sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs for 120 data transmission on a downlink and/or an uplink.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein for prioritized HARQ feedback transmission in sidelink communications. For example, as shown in FIG. 2, the controller/processor 280 of the UE 120a includes a HARQ module 281 that may be configured to perform the operations illustrated in FIG. 7, as well as other operations disclosed herein for prioritized HARQ feedback transmission in sidelink communications, in accordance with aspects of the present disclosure. Although shown at the controller/processor, other components of the UE 120a and the BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
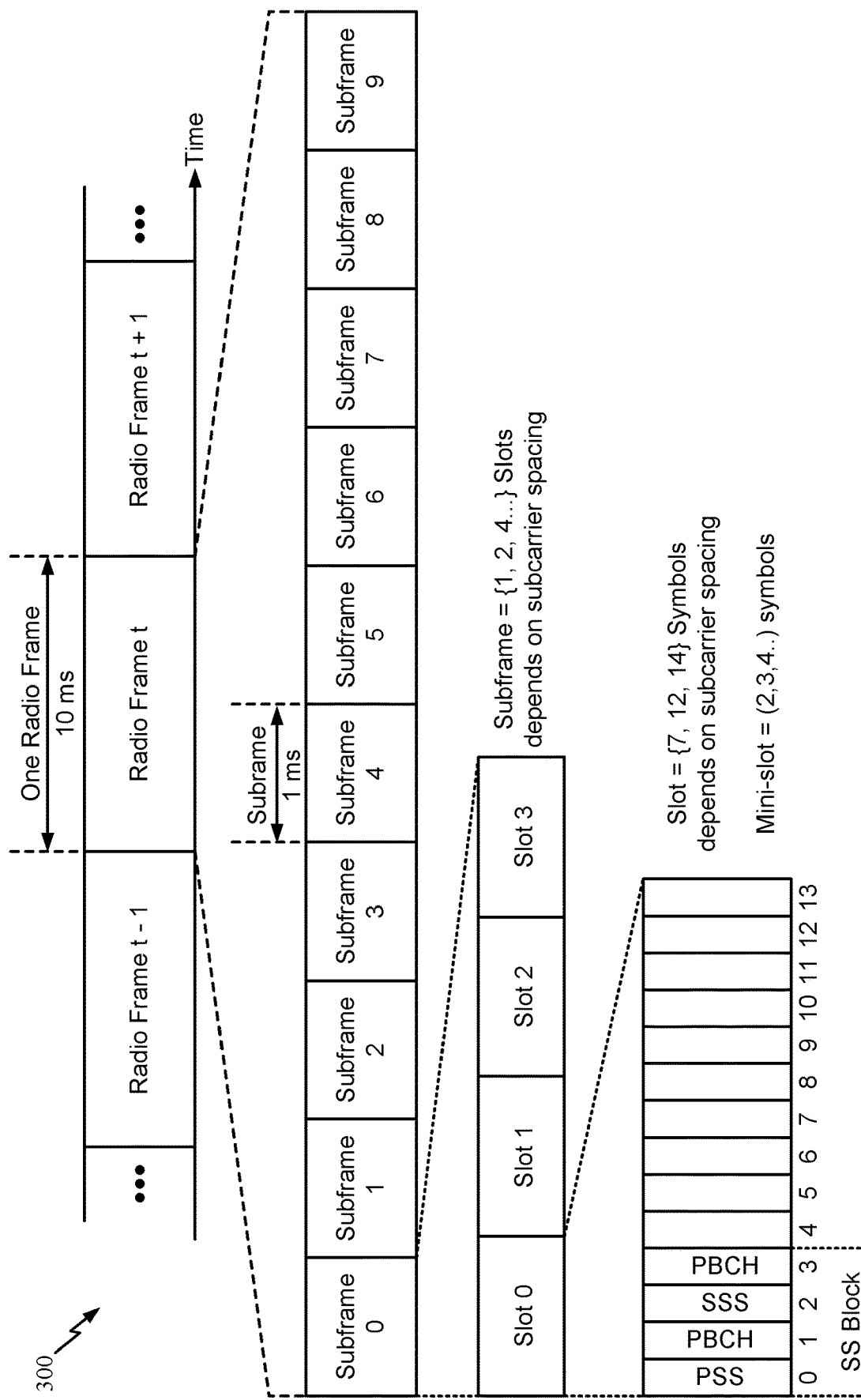
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

The SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may broadcast both SSB and remaining minimum system information (RMSI), for example, with SIB1 and SIB2. A non-standalone cell may only broadcast SSB, without broadcasting RMSI. In a single carrier in NR, multiple SSBs may be sent in different frequencies, and may include the different types of SSB.

Example Sidelink Communication

Communication between wireless nodes (such as a user equipment (UE) and a base station (BS)) may be referred to as an access link. Communication between multiple UEs may be referred as sidelink. Real-world applications of sidelink communications may include vehicle-to-vehicle (V2V) communications, internet of everything (IoE) communications, etc.

UEs may communicate with each other using sidelink signals. A sidelink signal may refer to a signal communicated from one UE (for example, a transmitter UE) to another UE (for example, a receiver UE) without relaying that communication through the BS, even though the BS may be utilized for scheduling and/or control purposes. The sidelink signals may be communicated using a licensed spectrum (unlike wireless local area networks that may use an unlicensed spectrum). One example of sidelink communication is PC5 as used in V2V communications.

Sidelink channels may be used for sidelink communications. The sidelink channels may include a physical sidelink discovery channel (PSDCH), a physical sidelink control channel (PSCCH), a physical sidelink shared channel (PSSCH), and a physical sidelink feedback channel (PSFCH). The PSDCH may carry discovery expressions, which may enable proximal UEs to discover each other. The PSCCH may carry control signaling such as sidelink resource configurations and other parameters used for data transmissions. The PSSCH may carry data transmissions. The PSFCH may carry feedback such as channel state information (CSI) related to a sidelink channel quality.

Figures 4A, 4B:
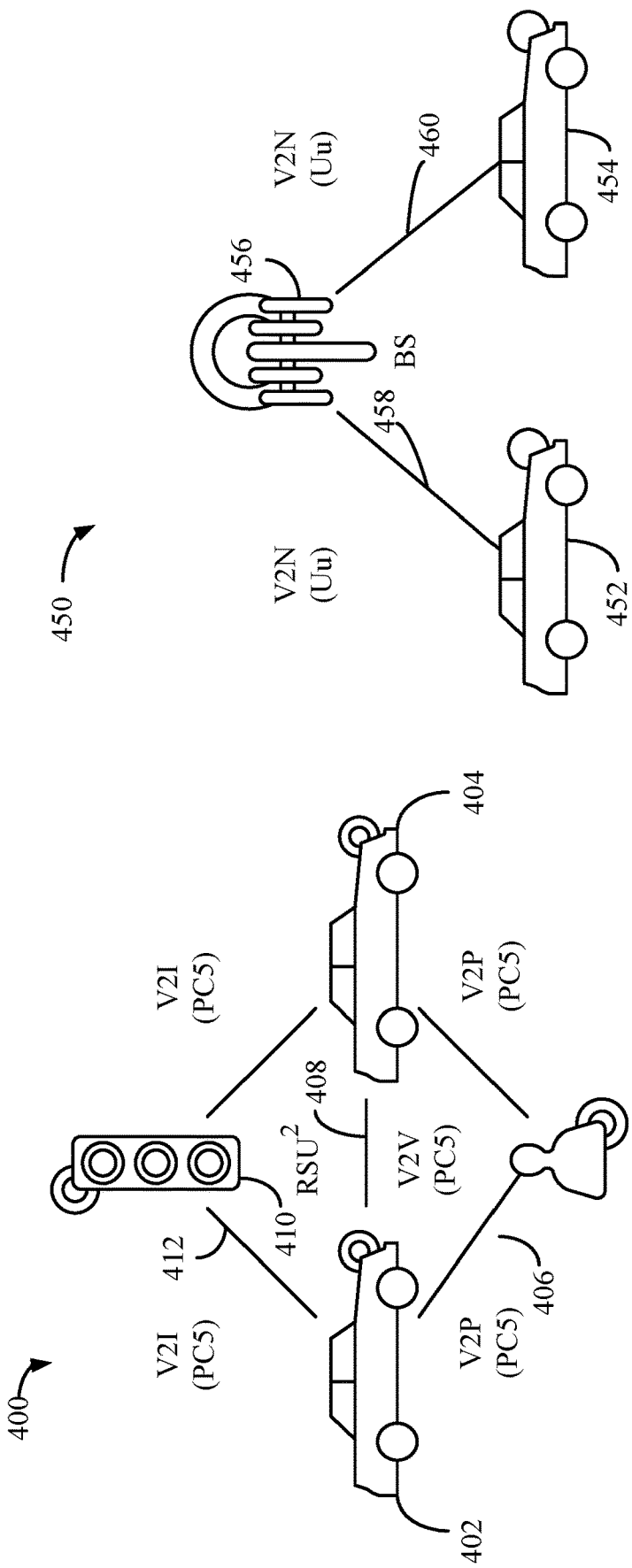
FIG. 4A and FIG. 4B show diagrammatic representations of example vehicle to everything (V2X) systems, in accordance with certain aspects of the present disclosure.

FIG. 4A and FIG. 4B show diagrammatic representations of example vehicle to everything (V2X) systems. Vehicles shown in these V2X systems may communicate via sidelink channels.

The V2X systems in FIG. 4A and FIG. 4B provide two complementary transmission modes. A first transmission mode, shown by way of example in FIG. 4A, involves direct communications (for example, also referred to as sidelink communications) between vehicles in proximity to one another in a local area. A second transmission mode, shown by way of example in FIG. 4B, involves network communications through a network, which may be implemented over a Uu interface (for example, a wireless communication interface between a radio access network (RAN) and a vehicle).

Referring to FIG. 4A, a V2X system 400 (including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, a highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., such as the BS 110a of FIG. 1 or FIG. 2), that sends and receives information to and from (for example, relays information between) the vehicles 452, 454. The network communications through vehicle to network (V2N) links 458 and 460 may be used, for example, for long range communications between the vehicles 452, 454, such as for communicating the presence of a car accident a distance ahead along a road or highway. Other types of communications may be sent by the BS to the vehicles 452, 454, such as traffic flow conditions, road hazard warnings, environmental/weather reports, and service station availability, among other examples. Such data can be obtained from cloud-based sharing services.

Example HARQ Feedback Transmission

Sidelink communications between wireless nodes may include use of various feedback signaling. One form of feedback is hybrid automatic repeat request (HARQ) feedback. HARQ feedback may be provided by a receiver wireless node (e.g., a receiver user equipment (UE)) to a transmitter wireless node (e.g., a transmitter UE), and may include transmission of several reporting signals to the transmitter wireless node. Example reporting signals may include acknowledgement (ACK) signals representing an ACK state, and negative acknowledgement (NACK) signals representing a NACK state. An ACK signal may be transmitted as part of HARQ feedback in response to successful reception and decoding of a data transmission. A NACK signal may be transmitted as part of HARQ feedback in response to a reception of a data transmission but an unsuccessful decoding of the data transmission.

There are different types of HARQ feedbacks corresponding to different modes such as unicast mode and groupcast mode. Unicast is used herein to mean the transmission of data (such as information packets) to a single destination. Groupcast is used herein to mean the transmission of data to multiple destinations.

In unicast mode, a transmitter wireless node may send a data transmission (physical sidelink shared channel (PSSCH)) to a receiver wireless node. The receiver wireless node may send a HARQ feedback transmission (physical sidelink feedback channel (PSFCH)) such as ACK or NACK feedback depending on a decoding outcome of the data transmission to the transmitter wireless node.

In groupcast mode, a transmitter wireless node may send a data transmission to multiple receiver wireless nodes. In mode 1 of groupcast mode, each receiver wireless node that is unable to decode received data transmission may send NACK feedback to the transmitter wireless node, and each receiver wireless node that is able to decode received data transmission may not send any HARQ feedback to the transmitter wireless node. In mode 2 of groupcast mode, each receiver wireless node may send ACK or NACK feedback depending on a decoding outcome of received data transmission to the transmitter wireless node.

Figure 5:
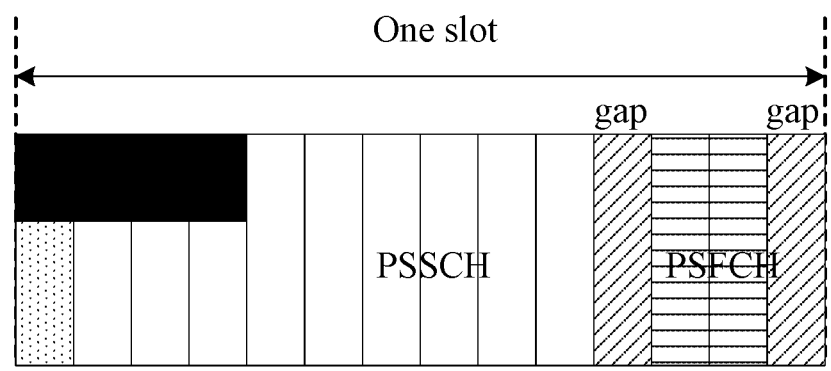
FIG. 5 shows an example slot in a radio frame, in accordance with certain aspects of the present disclosure.
Figure 6:
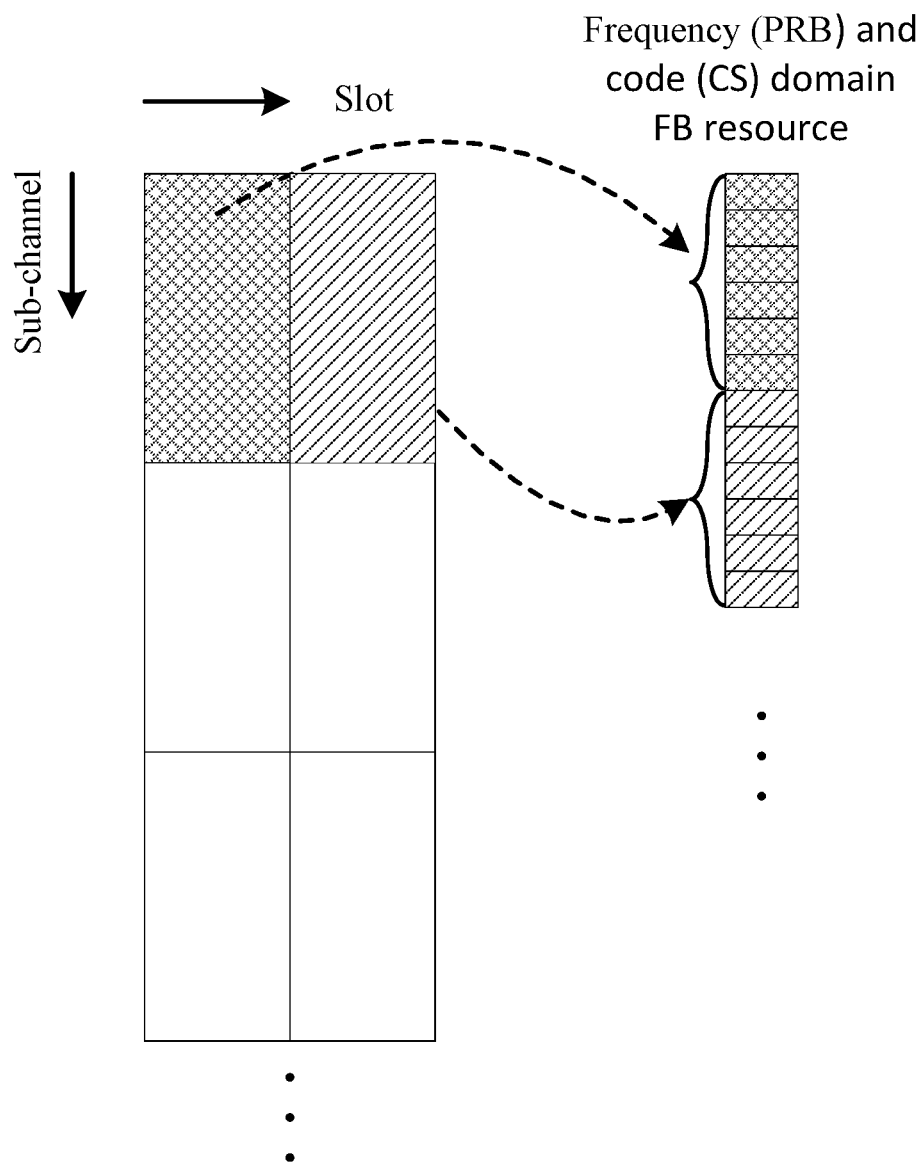
FIG. 6 shows an example slot and frequency resources, in accordance with certain aspects of the present disclosure.

In some cases, a receiver wireless node may receive multiple data transmissions from multiple transmitter wireless nodes. In response, the receiver wireless node may send multiple HARQ feedbacks to the transmitter wireless nodes in one HARQ feedback occasion (e.g., in the same HARQ feedback slot), as illustrated in FIGS. 5 and 6. In this HARQ feedback mechanism executed by the receiver wireless node, the receiver wireless node may send the HARQ feedbacks to the transmitter wireless nodes in different frequency resources (such as physical resource blocks (PRBs)). In some examples, the receiver wireless node may send the HARQ feedbacks to the transmitter wireless nodes in preconfigured PSFCH resources, which may occur in every N slots (N=0,1,2,4). The PSFCH resources may be determined based on time and frequency location of data channel transmissions, transmitter wireless nodes identification data (ID), and/or a receiver wireless node ID (when HARQ feedback is for ACK/NACK based groupcast communication). In one example, the receiver wireless node may send each HARQ feedback in one PRB and two orthogonal frequency-division multiplexing (OFDM) symbols in a PSFCH resource. In some cases, multiple PSFCH resources may be configured corresponding to a data transmission. For example, the PSFCH resources may be used for HARQ feedback for groupcast mode 2 where different receiver wireless nodes in a group may transmit a HARQ feedback in different PSFCH resources.

A maximum number of HARQ feedbacks that the receiver wireless node may send is specified (for example, specified in standards and/or (pre)configured at a UE). When the receiver wireless node has more HARQ feedbacks to send in one HARQ feedback slot than it is allowed, the receiver wireless node may select a subset of HARQ feedbacks from a total number of HARQ feedbacks that the receiver wireless node may be able to send. In some cases, the receiver wireless node may select this subset of HARQ feedbacks based on data channel attributes. The receiver wireless node may send the selected HARQ feedbacks to the transmitter wireless nodes. The receiver wireless node may drop and not send unselected HARQ feedbacks.

In unicast mode, an absence of HARQ feedback from a receiver wireless node may be treated as a discontinuous transmission (DTX) state (equivalent to NACK feedback) of the receiver wireless node by a transmitter wireless node. In one example, the transmitter wireless node may send some data to the receiver wireless node. The receiver wireless node may receive and decode the data. After sending the data, the transmitter wireless node may be expecting HARQ feedback from the receiver wireless node in a HARQ feedback occasion. In some cases, the transmitter wireless node may be unable to detect the HARQ feedback. This may be because of channel fading or interference, which may make it difficult for the transmitter wireless node to detect and decode any HARQ feedback. Another reason may be that the receiver wireless node did not send any HARQ feedback. The receiver wireless node may not send any HARQ feedback to the transmitter wireless node because of various reasons. In some cases, the receiver wireless node may have to drop ACK feedback corresponding to successful decoding of data (as the receiver wireless node is only able to send limited HARQ feedbacks). When no HARQ feedback is received, the transmitter wireless node may determine that the receiver wireless node is in the DTX state. The transmitter wireless node may retransmit same data to the receiver wireless node. However, the receiver wireless node may not need this retransmitted data as the receiver wireless node has been able to previously decode the data. This unnecessary retransmission may increase interference and incur more congestion in a transmission resource. In another example, the receiver wireless node may be unable to decode received data and may also have to drop NACK feedback corresponding to unsuccessful decoding of the data (as the receiver UE is only able to send limited HARQ feedbacks). When a number of consecutive absence of HARQ feedbacks is greater than a threshold, a radio link failure (RLF) may be triggered.

In groupcast mode 1, an absence of HARQ feedback from a receiver wireless node is treated as ACK feedback by a transmitter wireless node. This may be an improper assumption when the receiver wireless node is unable to receive and/or decode previously sent data by the transmitter wireless node.

In groupcast mode 2, an absence of HARQ feedback from a receiver wireless node triggers retransmission of same data by a transmitter wireless node. This may not be required when the receiver wireless node was able to receive and/or decode previously sent data. Such unnecessary data retransmissions may significantly increase transmission congestion.

Example Prioritized HARQ Feedback Transmission in Sidelink Communications

Aspects of the present disclosure relate to wireless communications, and more particularly, to prioritized HARQ feedback transmission in sidelink communications, which may prevent unnecessary data retransmission and reduce transmission congestion.

Figure 7:
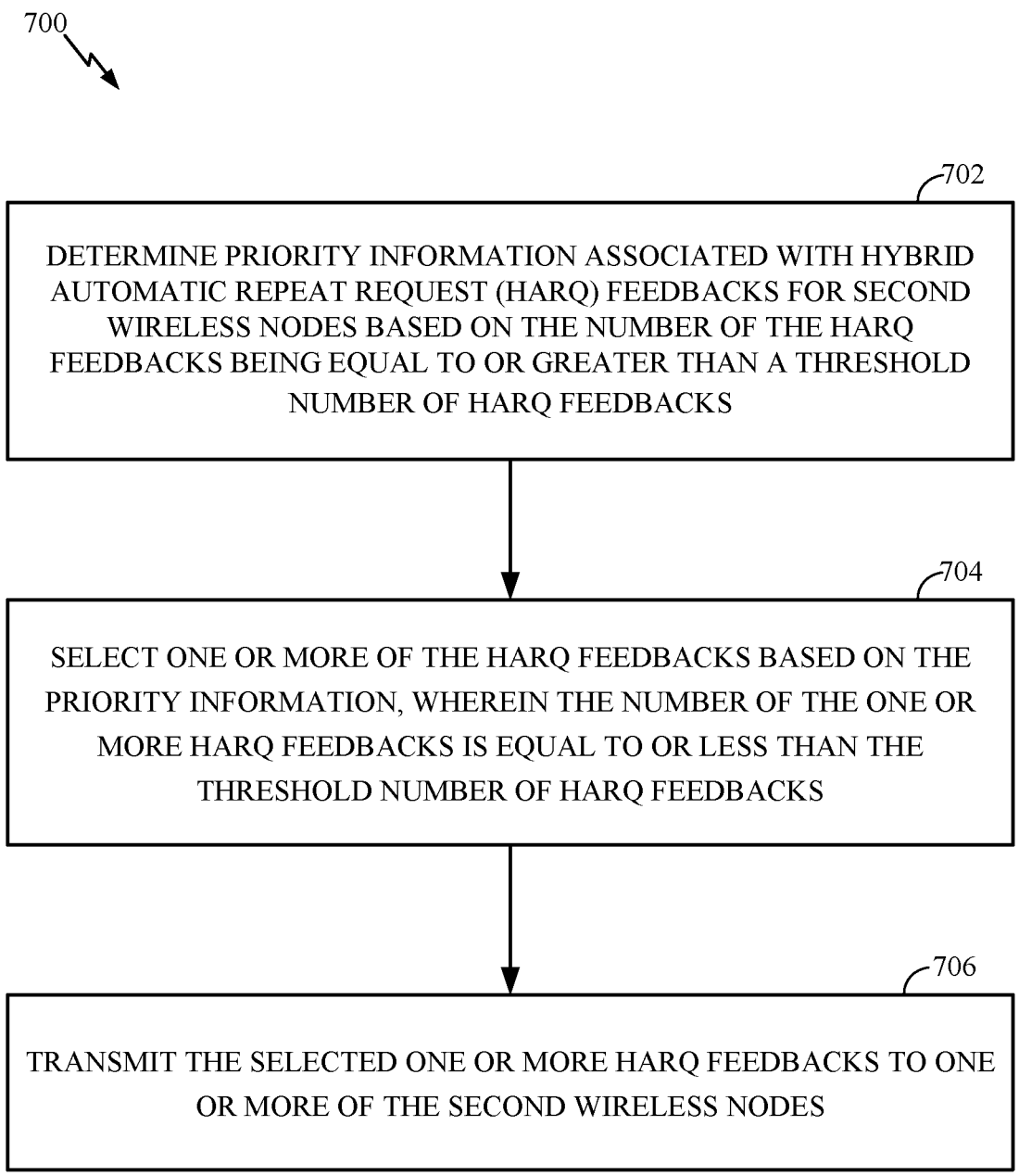
FIG. 7 is a flow diagram illustrating example operations for wireless communication by a first wireless node, in accordance with certain aspects of the present disclosure.

FIG. 7 is a flow diagram illustrating example operations 700 for wireless communication. Operations 700 may be performed by a first wireless node (e.g., a receiver user equipment (UE) such as the UE 120a in FIG. 1 or FIG. 2) for prioritized HARQ feedback transmission in sidelink communications, in accordance with aspects of the present disclosure.

Operations 700 begin, at 702, by determining priority information associated with HARQ feedbacks, for second wireless nodes (e.g., transmitter UEs), based on a number of the HARQ feedbacks being equal to or greater than a threshold number of HARQ feedbacks. The first wireless node determines the priority information using a processor of the UE 120a shown in FIG. 1 or FIG. 2 and/or of the apparatus shown in FIG. 8.

At 704, the first wireless node selects one or more of the HARQ feedbacks based on the priority information. The selected one or more HARQ feedbacks is equal to or less than the threshold number of HARQ feedbacks. The first wireless node selects the one or more of the HARQ feedbacks using a processor of the UE 120a shown in FIG. 1 or FIG. 2 and/or of the apparatus shown in FIG. 8.

At 706, the first wireless node transmits the selected one or more HARQ feedbacks to one or more of the second wireless nodes. The first wireless node transmits the selected one or more HARQ feedbacks using antenna(s) and transmitter/transceiver components of the UE 120a shown in FIG. 1 or FIG. 2 and/or of the apparatus shown in FIG. 8.

In certain aspects, the priority information is determined based on a type of the HARQ feedbacks. The HARQ feedbacks are of a first type or a second type. The first type indicates an acknowledgement (ACK) feedback. The second type indicates a negative acknowledgement (NACK) feedback. In some examples, the first wireless node prioritizes selecting and sending of ACK feedbacks over NACK feedbacks.

In certain aspects, the priority information is determined based on a number of prior successful transmissions of the HARQ feedbacks. For example, the first wireless node has previously decoded a first data transmission received from a second wireless node and sent ACK feedback corresponding to the first data transmission a number of times. Nevertheless, the first wireless node again receives the first data transmission from the second wireless node. This may happen because the second wireless node received NACK feedback corresponding to the first data transmission from another wireless node. So, the second wireless node may determine to retransmit the first data transmission. In this example, the first wireless node may prioritize and transmit HARQ feedback for a certain number of times (e.g., a pre-determined number of transmissions) and after that, ACK feedback to the second wireless node may not be prioritized, and the first wireless node may use its capacity to transmit other HARQ feedbacks.

In certain aspects, the priority information is determined based on a number of times the HARQ feedbacks have been previously dropped by the first wireless node. For example, the first wireless node drops a certain ACK feedback corresponding to a same data transmission for a threshold number of times. The first wireless node may then prioritize sending of this ACK feedback over other HARQ feedbacks.

In certain aspects, the priority information is determined based on a type of a transmission mode associated with one or more of the second wireless nodes. The transmission mode may be unicast mode, groupcast mode 1, and groupcast mode 2. In some examples, the first wireless node may prioritize sending of HARQ feedbacks to wireless nodes operating in a unicast mode over other modes.

In certain aspects, the priority information is determined based on a priority associated with data channels corresponding to data transmissions from the second wireless nodes. For example, the first wireless node receives the data transmissions from the second wireless nodes. The first wireless nodes determines the HARQ feedbacks for the second wireless nodes based on the reception of the data transmissions. The first wireless node determines the priority information based on the priority of the data channels of these data transmissions.

In certain aspects, the priority information is determined based on a congestion level of a resource pool associated with the first wireless node. For example, the first wireless node prioritizes selecting and sending of ACK feedback over NACK feedback when the congestion level is high, as ACK feedback may terminate retransmission and therefore reduce congestion.

In certain aspects, to select the one or more of the HARQ feedbacks, the first wireless node determines a priority score for each of the HARQ feedbacks based on the priority information. To determine the priority score for each HARQ feedback, the first wireless node assigns weights to parameters associated with each HARQ feedback (such as a type of the HARQ feedback, a number of prior successful transmissions of the HARQ feedback, etc.) included within the priority information. The first wireless node calculates the priority score for each HARQ feedback based on the assigned weights. The first wireless node then selects the one or more HARQ feedbacks that have priority scores that are higher than priority scores of the remaining unselected HARQ feedbacks. The first wireless node transmits the selected one or more HARQ feedbacks to the one or more of the second wireless nodes.

In certain aspects, the first wireless mode may sequentially apply metrics associated with the priority information to select the one or more of the HARQ feedbacks for transmission. The first wireless node then transmits the selected one or more HARQ feedbacks to the one or more of the second wireless nodes. In one example, at first, the first wireless node may prioritize selecting and sending ACK feedbacks over NACK feedbacks. The first wireless node may select all ACK feedbacks. The first wireless node may determine that a total number of ACK feedbacks is still greater than the threshold number of HARQ feedbacks, which are allowed for transmission. The first wireless node may further select a subset from these ACK feedbacks based on other priority parameters (such as data channel priority). The first wireless node may continue this sequential selection process until the selected ACK feedbacks are equal to or less than the threshold number of HARQ feedbacks. The first wireless node may transmit the selected HARQ feedbacks. In another example, the first wireless node may first select HARQ feedbacks for transmission based on data channel priority. If all data transmissions have a same priority, the first wireless node may then prioritize selecting and sending ACK feedbacks over NACK feedbacks.

Non-Limiting Examples

In one example, a receiver UE (operating in unicast mode) may prioritize selecting and sending ACK feedback over NACK feedback to a transmitter UE, so that the transmitter UE does not retransmit same data to the receiver UE. This may improve resource usage.

In another example, a receiver UE (operating in unicast mode) may prioritize selecting and sending a certain HARQ feedback over other HARQ feedbacks to a transmitter UE after dropping the same HARQ feedback for a number of times. This may prevent the transmitter UE to trigger a radio link failure (RLF). For example, the receiver UE may drop a first HARQ feedback for a same first data transmission for a number of times (e.g., due to lower priority). If the number of consecutive dropping reaches a threshold (e.g., maxNum-ConsecutiveDTX), the transmitter UE may declare RLF. To prevent this, the receiver UE may prioritize sending of this first HARQ feedback over other HARQ feedbacks if the number of consecutive dropping of the first HARQ feedback is about to reach the threshold. For example, the first HARQ feedback is prioritized if the number of consecutive dropping of the first HARQ feedback reaches the threshold that is configured for HARQ feedback prioritization.

In another example, a receiver UE (operating in unicast mode) may prioritize selecting and sending ACK feedback over NACK feedback to a transmitter UE when a congestion level of a resource pool is high. The receiver UE may measure channel busy ratio (CBR) in the resource pool, which may indicate a ratio of resources within the resource pool that may be busy. The receiver UE may prioritize sending of ACK feedback over NACK feedback if the measured CBR is high (e.g., when the measured CBR is higher than a pre-determined CBR threshold). This may prevent any unnecessary data retransmission by the transmitter UE.

In another example, a receiver UE from a group of receiver UEs (operating in groupcast mode 1) may prioritize selecting and sending ACK feedback over NACK feedback for HARQ feedback transmission in a physical sidelink feedback channel (PSFCH) occasion. This may be done because, in this mode, absence of any HARQ feedback is treated as NACK feedback by the transmitter UE. Moreover, when any receiver UE within the group does not send ACK feedback to the transmitter UE, it may trigger retransmission of same data to all receiver UEs by the transmitter UE. Hence, prioritizing sending of ACK feedback over other HARQ feedbacks may avoid unnecessary data retransmissions.

In another example, a receiver UE from a group of receiver UEs (operating in groupcast mode 1) may prioritize selecting and sending ACK feedback to a transmitter UE if ACK feedback has not been transmitted before. For instance, when it may be a first time to transmit ACK feedback corresponding to a certain data transmission, the receiver UE may prioritize sending this ACK feedback. After one successful transmission of this ACK feedback, subsequent HARQ feedbacks for this same data transmission (e.g., when the transmitter UE retransmits the data transmission) are not prioritized.

In another example, a receiver UE from a group of receiver UEs (operating in groupcast mode 1) may prioritize selecting and sending ACK feedback to a transmitter UE for a threshold number of times. For example, the transmitter UE may send a data transmission for a number of times to the receiver UE (e.g., in response to NACK feedback from some receiver UEs within the group). The receiver UE may prioritize sending of ACK feedback for this data transmission for a threshold number of times. The receiver UE would not prioritize any more feedbacks after sending a threshold number of successful ACK feedbacks for this data transmission.

In another example, a receiver UE from a group of receiver UEs (operating in groupcast mode 1) may prioritize selecting and sending ACK feedback over NACK feedback to a transmitter UE when a congestion level of a resource pool is high. This may prevent any unnecessary data retransmission by the transmitter UE.

In another example, a receiver UE from a group of receiver UEs (operating in groupcast mode 1) may prioritize sending ACK feedback to a transmitter UE after dropping the same ACK feedback for a certain number of times.

Figure 8:
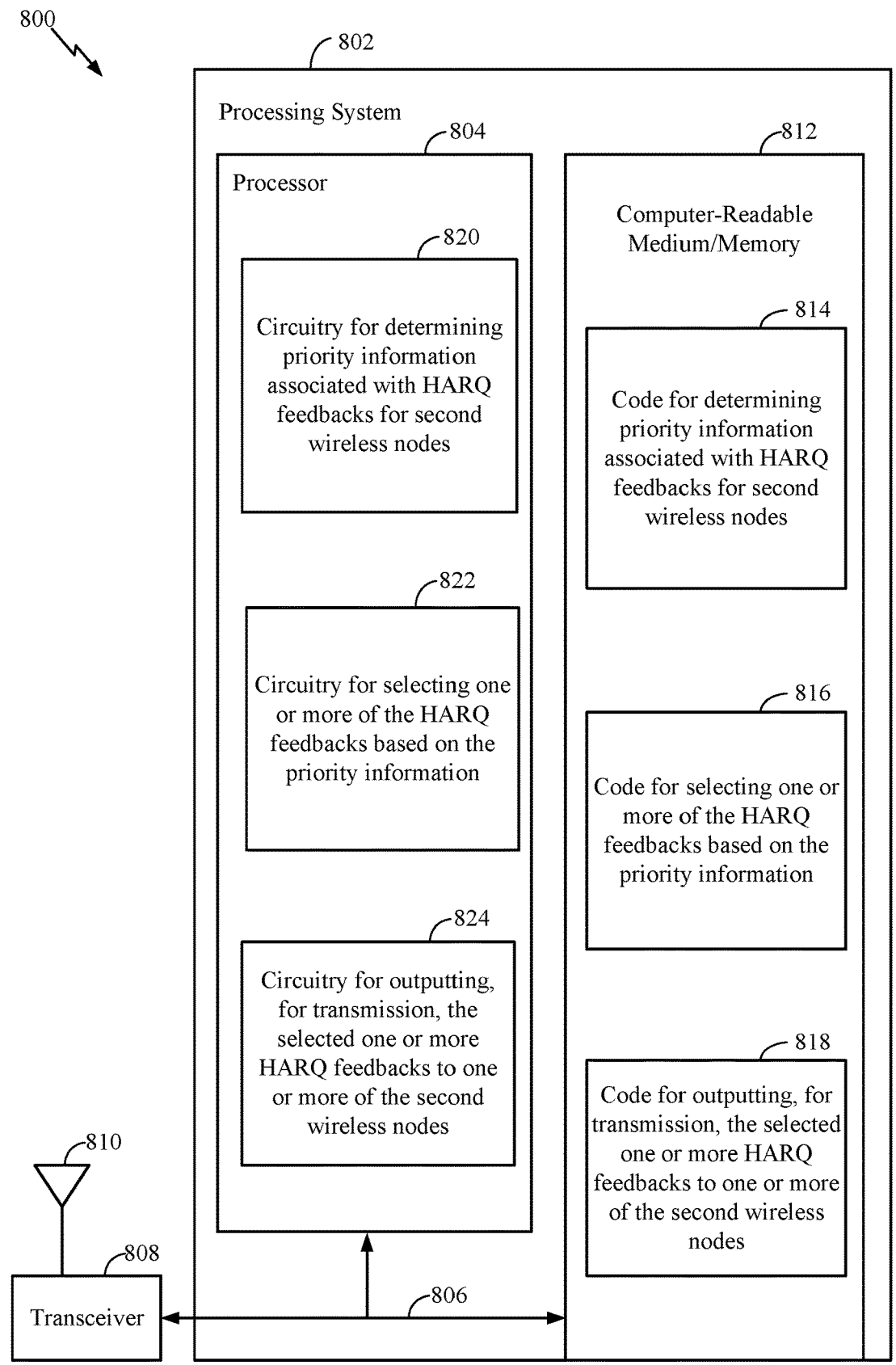
FIG. 8 illustrates a communications device that may include various components configured to perform operations for techniques disclosed herein, in accordance with aspects of the present disclosure.

FIG. 8 illustrates a communications device 800 that may include various components (e.g., corresponding to means-plus-function components) configured to perform operations for techniques disclosed herein, such as the operations illustrated in FIG. 7. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 is configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations for performing the various techniques discussed herein for prioritized HARQ feedback transmission in sidelink communications. In certain aspects, computer-readable medium/memory 812 stores code 814 for determining, code 816 for selecting, and code 818 for outputting (e.g., for transmission). The code 814 for determining may include code for determining priority information associated with HARQ feedbacks, for second wireless nodes based on the number of the HARQ feedbacks being equal to or greater than a threshold number of HARQ feedbacks. The code 816 for selecting may include code for selecting one or more of the HARQ feedbacks based on the priority information where a number of the one or more HARQ feedbacks is equal to or less than the threshold number of HARQ feedbacks. The code 818 for outputting may include code for outputting, for transmission, the selected one or more HARQ feedbacks to one or more of the second wireless nodes.

The processor 814 may include circuitry configured to implement the code stored in the computer-readable medium/memory 812, such as for performing the operations illustrated in FIG. 7, as well as other operations for prioritized HARQ feedback transmission in sidelink communications. For example, the processor 804 includes circuitry 820 for determining, circuitry 822 for selecting, and circuitry 824 for transmitting. The circuitry 820 for determining may include circuitry for determining priority information associated with HARQ feedbacks, for second wireless nodes based on the number of the HARQ feedbacks being equal to or greater than a threshold number of HARQ feedbacks. The circuitry 822 for selecting may include circuitry for selecting one or more of the HARQ feedbacks based on the priority information where a number of the one or more HARQ feedbacks is equal to or less than the threshold number of HARQ feedbacks. The circuitry 824 for transmitting may include circuitry for transmitting the selected one or more HARQ feedbacks to one or more of the second wireless nodes.

Example Aspects

Aspect 1: A method for wireless communications by a first wireless node, comprising: determining priority information associated with hybrid automatic repeat request (HARQ) feedbacks, for second wireless nodes, based on the number of the HARQ feedbacks being equal to or greater than a threshold number of HARQ feedbacks; selecting one or more of the HARQ feedbacks based on the priority information, wherein the number of the one or more HARQ feedbacks is equal to or less than the threshold number of HARQ feedbacks; and transmitting the selected one or more HARQ feedbacks to one or more of the second wireless nodes.

Aspect 2: The method of Aspect 1, further comprising: receiving data transmissions from the second wireless nodes; and determining the HARQ feedbacks for the second wireless nodes based the reception of the data transmissions.

Aspect 3: The method of any one of Aspects 1-2, wherein the determination of the priority information is further based on a type of one or more of the HARQ feedbacks.

Aspect 4: The method of Aspect 3, wherein each of the HARQ feedbacks is a first type or a second type, and wherein the first type indicates an acknowledgement (ACK) and the second type indicates a negative acknowledgement (NAK).

Aspect 5: The method of any one of Aspects 1-4, wherein the determination of the priority information is further based on a priority associated with one or more of the data transmissions from the second wireless nodes.

Aspect 6: The method of any one of Aspects 1-5, wherein the determination of the priority information is further based on a number of prior successful transmissions of the HARQ feedbacks.

7 Aspect: The method of any one of Aspects 1-6, wherein the determination of the priority information is further based on a number of times the HARQ feedbacks have been previously dropped by the first wireless node.

Aspect 8: The method of any one of Aspects 1-7, wherein the determination of the priority information is further based on a type of a transmission mode associated with one or more of the second wireless nodes.

Aspect 9: The method of Aspect 8, wherein the transmission mode is a unicast mode or a groupcast mode.

Aspect 10: The method of any one of Aspects 1-9, wherein the determination of the priority information is further based on a congestion level of a resource pool associated with the first wireless node.

Aspect 11: The method of any one of Aspects 1-10, wherein the selection of the one or more HARQ feedbacks comprises: determining a priority score for each of the HARQ feedbacks based on the priority information associated with each of the HARQ feedbacks.

Aspect 12: The method of Aspect 11, wherein the selection of the one or more HARQ feedbacks further comprises: selecting the one or more HARQ feedbacks having priority scores that are higher than priority scores of the remaining HARQ feedbacks.

Aspect 13: The method of Aspect 11, wherein the determination of the priority score for each of the HARQ feedbacks comprises: assigning weights to parameters included within the priority information, said parameters being associated with each of the HARQ feedbacks; and calculating the priority score for each of HARQ feedbacks based, at least in part, on the assigned weights.

Aspect 14: A first wireless node, comprising means for performing the operations of one or more of Aspects 1-13.

Aspect 15: A first wireless node, comprising a transceiver and a processing system including at least one processor configured to perform the operations of one or more of Aspects 1-13.

Aspect 16: An apparatus for wireless communications by a first wireless node, comprising: a processing system configured to determine priority information associated with hybrid automatic repeat request (HARQ) feedbacks, for second wireless nodes, based on the number of the HARQ feedbacks being equal to or greater than a threshold number of HARQ feedbacks, and select one or more of the HARQ feedbacks based on the priority information, wherein the number of the one or more HARQ feedbacks is equal to or less than the threshold number of HARQ feedbacks; and an interface configured to output, for transmission, the selected one or more HARQ feedbacks to one or more of the second wireless nodes.

Aspect 17: A computer-readable medium for wireless communications, comprising codes executable by an apparatus to: determine priority information associated with hybrid automatic repeat request (HARQ) feedbacks, for second wireless nodes, based on the number of the HARQ feedbacks being equal to or greater than a threshold number of HARQ feedbacks; select one or more of the HARQ feedbacks based on the priority information, wherein the number of the one or more HARQ feedbacks is equal to or less than the threshold number of HARQ feedbacks; and output, for transmission, the selected one or more HARQ feedbacks to one or more of the second wireless nodes.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a wireless device, a wireless communications device, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for selecting, means for assigning, and means for calculating may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, as well as other operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims

The invention claimed is:

1. A method for wireless communications by a first wireless node, comprising:
   determining priority information associated with hybrid automatic repeat request (HARQ) feedbacks, for second wireless nodes, based on a number of the HARQ feedbacks being equal to or greater than a threshold number of HARQ feedbacks and a number of prior transmissions of the HARQ feedbacks corresponding to a successful reception of one or more data transmissions;
   selecting one or more of the HARQ feedbacks based on the priority information, wherein the number of the one or more HARQ feedbacks is equal to or less than the threshold number of HARQ feedbacks, and wherein the number of prior transmissions of at least one selected HARQ feedback corresponding to the successful reception of the one or more data transmissions is less than a number of successful receptions of the one or more data transmissions associated with the at least one selected HARQ feedback; and
   transmitting the selected one or more HARQ feedbacks to one or more of the second wireless nodes.

2. The method of claim 1, further comprising:
   receiving a plurality of data transmissions from the second wireless nodes; and
   determining the HARQ feedbacks for the second wireless nodes based on reception of the plurality of data transmissions.

3. The method of claim 1, wherein the determination of the priority information is further based on a type of one or more of the HARQ feedbacks.

4. The method of claim 3, wherein each of the HARQ feedbacks is a first type or a second type, and wherein the first type indicates an acknowledgement (ACK) and the second type indicates a negative acknowledgement (NAK).

5. The method of claim 1, wherein the determination of the priority information is further based on a priority associated with the one or more data transmissions from the second wireless nodes.

6. The method of claim 1, wherein the determination of the priority information is further based on a number of times the HARQ feedbacks have been previously dropped by the first wireless node.

7. The method of claim 1, wherein the determination of the priority information is further based on a type of a transmission mode associated with one or more of the second wireless nodes.

8. The method of claim 7, wherein the transmission mode is a unicast mode or a groupcast mode.

9. The method of claim 1, wherein the determination of the priority information is further based on a congestion level of a resource pool associated with the first wireless node.

10. The method of claim 1, wherein the selection of the one or more HARQ feedbacks comprises:
    determining a priority score for each of the HARQ feedbacks based on the priority information associated with each of the HARQ feedbacks.

11. The method of claim 10, wherein the selection of the one or more HARQ feedbacks further comprises:
    selecting the one or more HARQ feedbacks having priority scores that are higher than priority scores of the remaining HARQ feedbacks.

12. The method of claim 10, wherein the determination of the priority score for each of the HARQ feedbacks comprises:
    assigning weights to parameters included within the priority information, said parameters being associated with each of the HARQ feedbacks; and
    calculating the priority score for each of HARQ feedbacks based, at least in part, on the assigned weights.

13. A first wireless node, comprising:
    a processing system configured to:
       determine priority information associated with hybrid automatic repeat request (HARQ) feedbacks, for second wireless nodes, based on a number of the HARQ feedbacks being equal to or greater than a threshold number of HARQ feedbacks and a number of prior transmissions of the HARQ feedbacks corresponding to a successful reception of one or more data transmissions; and
       select one or more of the HARQ feedbacks based on the priority information, wherein the number of the one or more HARQ feedbacks is equal to or less than the threshold number of HARQ feedbacks, and wherein the number of prior transmissions of at least one selected HARQ feedback corresponding to the successful reception of the one or more data transmissions is less than a number of successful receptions of the one or more data transmissions associated with the at least one selected HARQ feedback; and
    a transmitter configured to transmit the selected one or more HARQ feedbacks to one or more of the second wireless nodes.

14. The first wireless node of claim 13, further comprising:
    a receiver configured to receive a plurality of data transmissions from the second wireless nodes, wherein:
       the processing system is further configured to determine the HARQ feedbacks for the second wireless nodes based on reception of the plurality of data transmissions.

15. The first wireless node of claim 13, wherein the determination of the priority information is further based on a type of one or more of the HARQ feedbacks.

16. The first wireless node of claim 13, wherein the determination of the priority information is further based on a priority associated with the one or more data transmissions from the second wireless nodes.

17. A first wireless node for wireless communications, comprising:
   a memory comprising instructions; and
   one or more processors configured to execute the instructions and cause the first wireless node to:
      determine priority information associated with hybrid automatic repeat request (HARQ) feedbacks, for second wireless nodes, based on a number of the HARQ feedbacks being equal to or greater than a threshold number of HARQ feedbacks and a number of prior transmissions of the HARQ feedbacks corresponding to a successful reception of one or more data transmissions; and
      select one or more of the HARQ feedbacks based on the priority information, wherein the number of the one or more HARQ feedbacks is equal to or less than the threshold number of HARQ feedbacks, and wherein the number of prior transmissions of at least one selected HARQ feedback corresponding to the successful reception of the one or more data transmissions is less than a number of successful receptions of the one or more data transmissions associated with the at least one selected HARQ feedback; and
      output, for transmission, the selected one or more HARQ feedbacks to one or more of the second wireless nodes.

18. A non-transitory computer-readable medium for wireless communications, comprising codes executable by an apparatus to:
   determine priority information associated with hybrid automatic repeat request (HARQ) feedbacks, for second wireless nodes, based on a number of the HARQ feedbacks being equal to or greater than a threshold number of HARQ feedbacks and a number of prior transmissions of the HARQ feedbacks corresponding to a successful reception of one or more data transmissions;
   select one or more of the HARQ feedbacks based on the priority information, wherein the number of the one or more HARQ feedbacks is equal to or less than the threshold number of HARQ feedbacks, and wherein the number of prior transmissions of at least one selected HARQ feedback corresponding to the successful reception of the one or more data transmissions is less than a number of successful receptions of the one or more data transmissions associated with the at least one selected HARQ feedback; and
   output, for transmission, the selected one or more HARQ feedbacks to one or more of the second wireless nodes.

* * * * *